United States Patent
Kawai (10) Patent No.: US 6,414,716 B1
(45) Date of Patent: Jul. 2, 2002

(54) METHOD AND APPARATUS FOR CONTROLLING AN IMAGING APPARATUS, IMAGING OPERATION CONTROL SYSTEM, AND STORAGE MEDIUM STORING A PROGRAM IMPLEMENTING SUCH A METHOD

(75) Inventor: Tomoaki Kawai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 08/972,358

(22) Filed: Nov. 18, 1997

(30) Foreign Application Priority Data

Nov. 29, 1996 (JP) .............................................. 8-319892

(51) Int. Cl.[7] .......................... H04N 5/232; H04N 7/14; H04N 7/18
(52) U.S. Cl. ...................... 348/211; 348/14.09; 348/159
(58) Field of Search ........................... 348/15, 16, 153, 348/159, 143, 722, 211, 14.08, 14.09; 709/204, 225, 219, 203, 205, 206, 207

(56) References Cited

U.S. PATENT DOCUMENTS

| | | | | |
|---|---|---|---|---|
| 4,992,866 A | * | 2/1991 | Morgan | 348/159 |
| 5,206,732 A | * | 4/1993 | Hudson | 348/211 |
| 5,689,553 A | * | 11/1997 | Ahuja et al. | 348/15 |
| 5,737,011 A | * | 4/1998 | Lukacs | 348/15 |
| 5,745,161 A | * | 4/1998 | Ito | 348/15 |
| 5,825,432 A | * | 10/1998 | Yonezawa | 348/159 |
| 6,002,995 A | * | 12/1999 | Suzuki et al. | 348/211 |

* cited by examiner

Primary Examiner—Wendy R. Garber
(74) Attorney, Agent, or Firm—Fitzpatrick, Cella, Harper & Scinto (57) ABSTRACT

The present invention provides a method, apparatus, and system for performing image sensing operations in an efficient manner in response to video data transmission requests or video camera control requests issued by a plurality of clients. The invention also provides a storage medium on which a program implementing the method is stored. A managing apparatus manages a plurality of camera servers each including a video camera and a controller. When the apparatus receives a video signal transmission request or a video camera control permission request from a client via a network, an available camera server is selected and connected to the client so that the client can control the camera server and display the video signal transmitted from that camera server. Each client can perform a desired camera control operation, receive a desired video signal, and display it on its screen without having to know which camera server is transmitting the video signal to the client.

44 Claims, 9 Drawing Sheets

| CAMERA SERVER APPARATUS ADDRESS | OPERATION TERMINAL ADDRESS | PASSWORD |
|---|---|---|
| 150. 61. 24. 1 | 0 | |
| 150. 61. 24. 2 | 130. 15. 12. 3 | PASSWORD1 |
| 150. 61. 24. 3 | 0 | |
| 150. 61. 24. 4 | 110. 8. 6. 12 | PASSWORD2 |
| ⋮ | ⋮ | ⋮ |
| 150. 61. 24. N | 0 | |

↑ ADDRESS OF THE REPRESENTATIVE CAMERA SERVER

METHOD AND APPARATUS FOR CONTROLLING AN IMAGING APPARATUS, IMAGING OPERATION CONTROL SYSTEM, AND STORAGE MEDIUM STORING A PROGRAM IMPLEMENTING SUCH A METHOD

BACKGROUND OF THE INVENTION

1. Field of the Invention

The present invention relates to a method, apparatus, and system for controlling an imaging apparatus which is adapted to be controlled via a network so that a desired video signal is generated by the imaging apparatus and is distributed over the network, and also to a recording medium storing a program according to which the method, apparatus, and system are implemented or operated.

2. Description of the Related Art

It is known in the art of the imaging system to connect a video camera to a network such as the Internet and transmit a video signal obtained via the video camera over the network so that the video signal can be observed at various remote locations. In some such systems, users can observe not only an image taken via a video camera but also can remotely control the conditions of the video camera such as the panning and tilting angle and the zooming ratio via the network. For example, there is a system in which a video camera that can be computer-controlled is connected to a WWW (World Wide Web) server on the Internet so that an image taken by the video camera is distributed on a real-time basis to clients via the network wherein the clients are allowed to control the video camera.

In such a system in which a plurality of clients are allowed to access the computer-controllable video camera at the same time, an image signal sensed by the video camera can be transmitted to the plurality of the clients at the same time and thus the plurality of clients can view the image. However, it is impossible for a plurality of clients to control the video camera at the same time. In the conventional systems, no priority in terms of the control of the video camera is given to any client, and clients operate the video camera under no particular control. Therefore, if a plurality of clients issue, at the same time, camera control commands requesting that the video camera be tilted or panned into different angles, the camera control system interprets and executes the camera control commands in the order of reception. As a result, continual competition occurs among clients to attempt to control the video camera. If such competition occurs, no clients can control the video camera and the image taken by the video camera in such a situation will be meaningless to any client.

One known technique of avoiding the above problem is to give permission to control the video camera for a fixed period of time to one client after another. However, in this technique, each client can control the video camera only for a limited period of time and thus it is difficult for clients to control the video camera in a desired manner.

SUMMARY OF THE INVENTION

In view of the above, it is an object of the present invention to provide a method, apparatus, and system for performing image sensing operations in an efficient manner in response to video data transmission requests or video camera control requests issued by a plurality of clients.

It is another object of the present invention to provide a storage medium storing a program implementing such a method.

It is still another object of the present invention to provide a method, apparatus, and system capable of avoiding competition among a plurality of clients in access to imaging apparatus so that the imaging apparatus may be controlled correctly in response to requests of the respective clients. It is a further object of the present invention to provide a storage medium storing a program implementing such a method.

According to an aspect of the present invention, to achieve at least one of the above objects, there is provided a control apparatus for controlling a plurality of camera servers, each camera server comprising a video camera and a controller for controlling the video camera. The control apparatus comprises: receiving means for receiving a control command transmitted from a client; interpreting means for interpreting the control command received via the receiving means; and selecting means for selecting a camera server in a free state from the plurality of camera servers when the interpreting means determines that the control command is a video camera control permission request.

According to another aspect of the present invention, there is provided a camera control system for making connections via a network among (1) a plurality of camera servers each including a video camera and a controller for controlling the video camera, (2) a control apparatus for controlling the plurality of camera servers, and (3) clients. The control apparatus comprises: receiving means for receiving a control command transmitted from a client; interpreting means for interpreting the control command received via the receiving means; and selecting means for selecting a camera server in a free state from the plurality of camera servers when the interpreting means determines that the control command is a video camera control permission request; and wherein each camera server comprises controlling means for controlling the video camera in accordance with a control command given by the client when the camera server is selected by the selecting means.

According to still another aspect of the present invention, there is provided a controlling method of a control apparatus for controlling a plurality of camera servers each including a video camera and a controller for controlling the video camera, the controlling method comprising the steps of: receiving a control command output by a client; interpreting the control command received in the receiving step; and if in the interpreting step the command is interpreted as a video camera control permission request, selecting a camera server in a free state from the plurality of camera servers.

According to a further aspect of the present invention, there is provided a controlling method of a camera control system for making connections via a network among (1) a plurality of camera servers, (2) a control apparatus for controlling the plurality of camera servers, and (3) clients. The method comprises the steps of: receiving a control command output by a client; interpreting the control command received in the receiving step; if in the interpreting step the command is interpreted as a video camera control permission request, selecting a camera server in a free state from the plurality of camera servers; and if a camera server is selected in the selecting step, controlling the video camera in accordance with a control command received from the client.

According to another aspect of the present invention, there is provided a storage medium for storing a program in accordance with which a control apparatus performs a process for controlling a plurality of camera servers each including a video camera and a controller for controlling the video camera, the process comprising the steps of: receiving a control command output by a client; interpreting the received control command; and if in the interpreting step the command is interpreted as a video camera control permission request, selecting a camera server in a free state from the plurality of camera servers.

These and other objects and features of the present invention will become more apparent from the following detailed description and the accompanying drawings.

DESCRIPTION OF THE PREFERRED EMBODIMENTS

The present invention will be described in further detail below with reference to preferred embodiments in conjunction with the accompanying drawings.

First Embodiment

In this first embodiment of a camera control system for taking a video signal by a camera connected to a network and transmitting the resultant video signal over the network, a plurality of camera controller/video signal transmitter units (camera servers) for controlling video cameras are provided in the system wherein the plurality of camera servers act as if they were a single camera server. In this system, it is possible to remotely control the video cameras via the network, and video signals generated by the video cameras are transmitted over the network.

Figure 1:
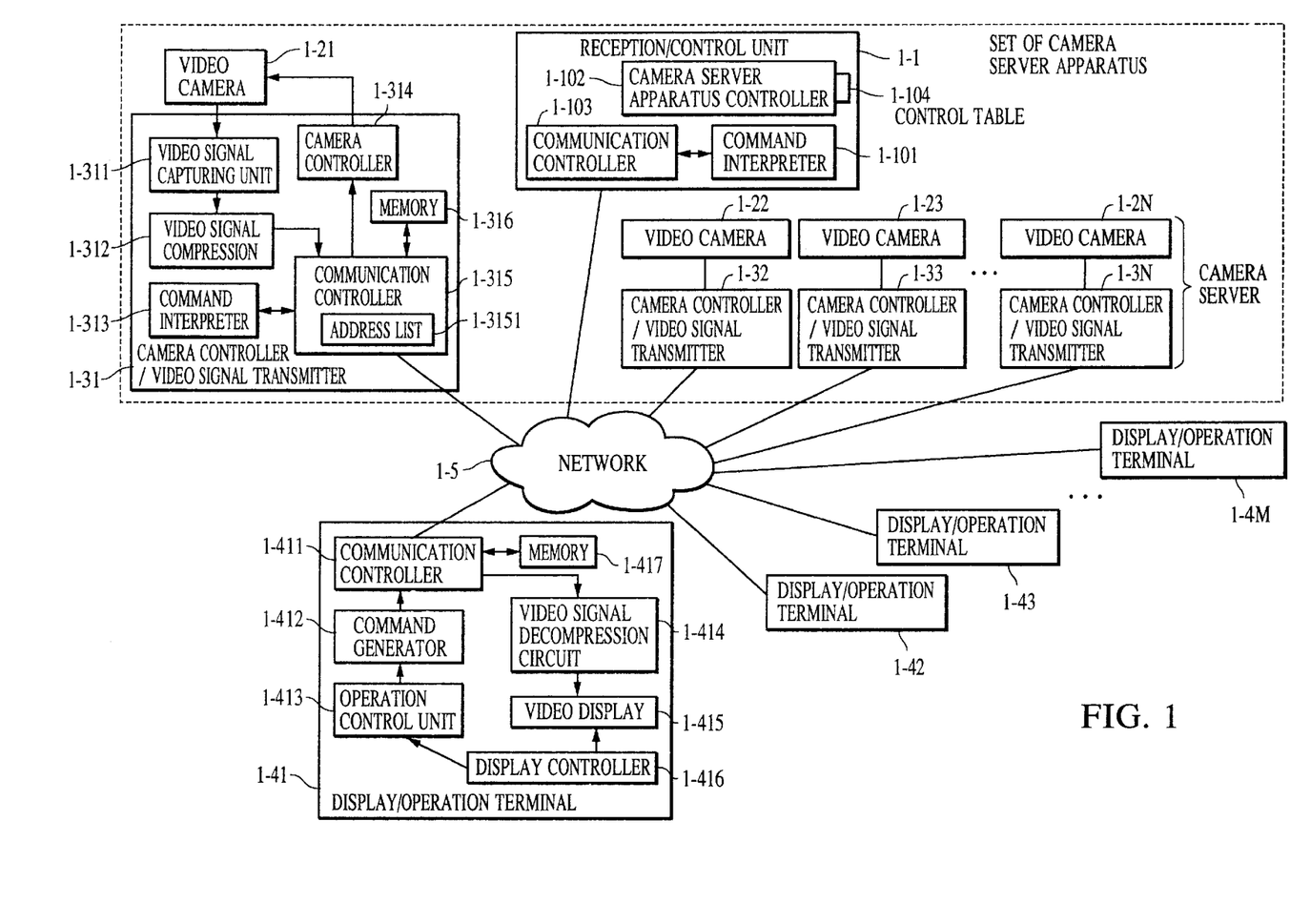
FIG. 1 is a block diagram illustrating an embodiment of an imaging system according to the present invention.

FIG. 1 is a block diagram illustrating the present embodiment of the camera control system connected to the network. In FIG. 1, the reception/control unit 1-1, the camera controller/video signal transmitter units 1-31 to 1-3N, and the displays/operation terminals 1-41 to 1-4M may be implemented either with hardware or by a combination of a microprocessor and software. In this specific embodiment, the respective units described above are made up of electronic control circuits including a CPU. The process represented by the flowchart in FIGS. 3, 4, 5, and 7, which will be described in detail later, is performed according to the program stored in a memory of the control circuit of each unit. The control program may be stored on a recording medium such as a hard disk, floppy disk, etc., and may be executed after being downloaded into a memory such as a RAM.

Referring to FIG. 1 the construction of the camera control system will be described below. The camera control system is connected to a network such as the Internet 1-5. Video cameras 1-21 to 1-2N have a similar structure, and can be panned and tilted by controlling the universal stand of the video cameras. The zooming ratio can also be controlled. If camera controller/video signal transmitter units (camera control servers) 1-31 to 1-3N having a similar construction receive a control command via the network 1-5, they interpret the received control command and control the operation of video cameras connected to respective camera controller/video signal transmitter units. Video signals generated by the video cameras are transmitted over the network 1-5. A camera controller/video signal transmitter unit 1-31 comprises a video signal capturing unit 1-311, a video signal compression circuit 1-312, a command interpreter 1-313, a camera controller 1-314, and a communication controller 1-315. The construction of the camera controller/video signal transmitter unit 1-31 will be described in further detail below. The other camera controller/video signal transmitter units 1-32 to 1-3N have a similar construction and operate in a similar manner although they are not described herein.

If the camera controller/video signal transmitter unit 1-31 receives a control command via the network 1-5, it operates in accordance with the received control command. The command interpreter 1-313 interprets the received control command, and controls various parts, which will be described later, in accordance with the specific instruction of the control command. The video signal capturing unit 1-311 captures a video signal in the format of for example NTSC from the video camera 1-21, and converts the captured video signal to a corresponding digital signal. The resultant digital video signal is compressed by the video signal compression circuit 1-312 by means of the MPEG or Motion JPEG technique. The compressed video signal is then transmitted to a specific client (display/operation terminal 1-4$i$: i=1 to M where M is the number of display/operation terminals) via the network 1-5 under the control of the communication controller 1-315 in accordance with the received control command. In accordance with the camera control request received via the network 1-5, the camera controller 1-314 controls the panning and tilting angle and also the zooming ratio of the video camera 1-21 so that these parameters are set to specified values. The communication controller 1-315 controls the communication between the network 1-5 and the various parts of the camera controller/video signal transmitter unit 1-31. The memory 1-316 stores the camera control command received, and also stores the compressed video signal and data required in various control operations. The address list 1-3151 is a table where the addresses of display/operation terminals to which the video signal is transmitted are registered.

In the compression process performed by the video signal compressing circuit 1-312, any technique of compressing digital motion video signals may be employed.

In the present embodiment, the camera controller/video signal transmitter unit 1-3N can accept the following commands:

PAN θ Client Address Client Password

TLT φ Client Address Client Password

ZOM σ Client Address Client Password

SRT Client Address

STP Client Address where PAN, TLT, ZOM, SRT, and STP represent pan, tilt, zoom, video signal transmission start request, and video signal transmission stop request, respectively. Symbols θ, φ, σ, Client Address, Client Password in the above commands represent the panning angle (θ), the tilting angle (φ), the zooming ratio (σ), the address of a display/operation terminal which generates the command, and the password of a display/operation terminal which generates the command which will be described later, respectively. θ, φ, and a are given in the form of a character string representing the angle or ratio within the ranges which are allowed in the control of the video camera.

Hereinafter, the combination of the video camera 1-21 and the camera controller/video signal transmitter unit 1-31 is referred to as a camera server. As described above, the video camera 1-22 and the camera controller/video signal transmitter unit 1-32, the video camera 1-23 and the camera controller/video signal transmitter unit 1-33, . . . are constructed in a similar manner and they also make up camera servers. In the present invention, the number of camera servers is not limited to a particular value. In the present embodiment, the system includes N (≧2) camera servers. The combination of these N camera servers and a reception/control unit 1-1 which will be described later is referred to as a set of camera servers. The video camera of the ith camera server is denoted by 1-2i and the camera controller/video signal transmitter unit is denoted by 1-3i. Furthermore, as in the camera controller/video signal transmitter unit 1-31, the ith camera controller/video signal transmitter unit 1-3i also includes similar internal modules such as a video signal capturing unit 1-3i1, a video signal compressing circuit 1-3i2, . . . , a memory 1-3i6.

The reception/control unit 1-1 comprises: a communication controller 1-103 for controlling the communication with the network 1-5; a command interpreter 1-101 which receives, under the control of the communication controller 1-103, a command generated by a display/operation terminal 1-4N via the network 1-5 and interprets the received command; and a camera server apparatus controller 1-102 for controlling the operation, such as the operation of controlling the representative camera servers of the set of camera servers, over the entire parts of the reception/control unit 1-1 in accordance with the command interpreted by the command interpreter 1-101.

In an initial state, the panning and tilting angles and the zoom ratio of the respective video cameras i-21 to i-2N in the ith set of camera servers are controlled so that each video camera generates a video signal representing a similar image. It is assumed herein that each camera server accepts at a time only a camera control command generated from one display/operation terminal.

The reception/control unit 1-1 is responsible for controlling all camera servers (1-31 to 1-3N) in one set of camera servers. As will be described in detail later, a particular camera server of the plurality of camera servers in the camera server set is selected as a representative camera server. In this specific embodiment, the camera server comprising the video camera 1-21 and the camera controller/video signal transmitter unit 1-31 is selected as the representative camera server. The representative camera server receives via the network a command transmitted from a display/operation unit which will be described later. In response to the command, the representative camera server selects a proper camera server and sends information about the address of the selected camera server.

The system may include a plurality of camera server sets connected to the network 1-5 wherein each camera server set includes one reception/control unit 1-1 and a plurality of camera servers 1-31 to 1-3N.

The display/operation terminal 1-41 acts as a client. That is, the display/operation terminal 1-41 is used to receive via the network a video signal generated by a video camera at a remote location and display the image in accordance with the received video signal. The display/operation terminal 1-41 is also used to control the camera operation of the video camera via the network. Each display/operation terminal comprises a communication controller 1-411, a memory 1-417, a command generator 1-412, an operation control unit 1-413, a video signal decompression circuit 1-414, a video display 1-415, and a display controller 1-416. The communication controller 1-411 controls the communication between the display/operation terminal and the network 1-5. More specifically, the communication controller 1-411 transmits a command generated by the command generator 1-412 via the network 1-5, and receives a video signal via the network 1-5. The operation control unit 1-413 includes a keyboard and a pointing device such as a mouse. Users can input various commands and data by operating the keyboard or the pointing device. The information input via the operation control unit 1-413 is transferred to the command generator 1-412. The command generator 1-412 generates a command corresponding to the given information. The command is transmitted over the network 1-5 via the communication controller 1-411. The video signal decompression circuit 1-414 decompresses the compressed video signal received via the communication controller 1-411 so as to reproduce the original video signal. The decompressed video signal is transmitted to the video display 1-415 and displayed on it under the control of the display controller 1-416. The display controller is responsible for controlling the operation of the display/operation terminal 1-41 over the entire parts thereof wherein a GUI (Graphical User Interface) is provided as shown in FIG. 2.

The number of display/operation terminals 1-4M (M is an integer equal to or greater than 1) connected to the network 1-5 is not limited to a particular value, and an arbitrary number of similar display/operation terminals may be connected to the network 1-5. Each display/operation terminal operates under the control of a proper windows system capable of providing a GUI such as that shown in FIG. 2.

Figure 2:
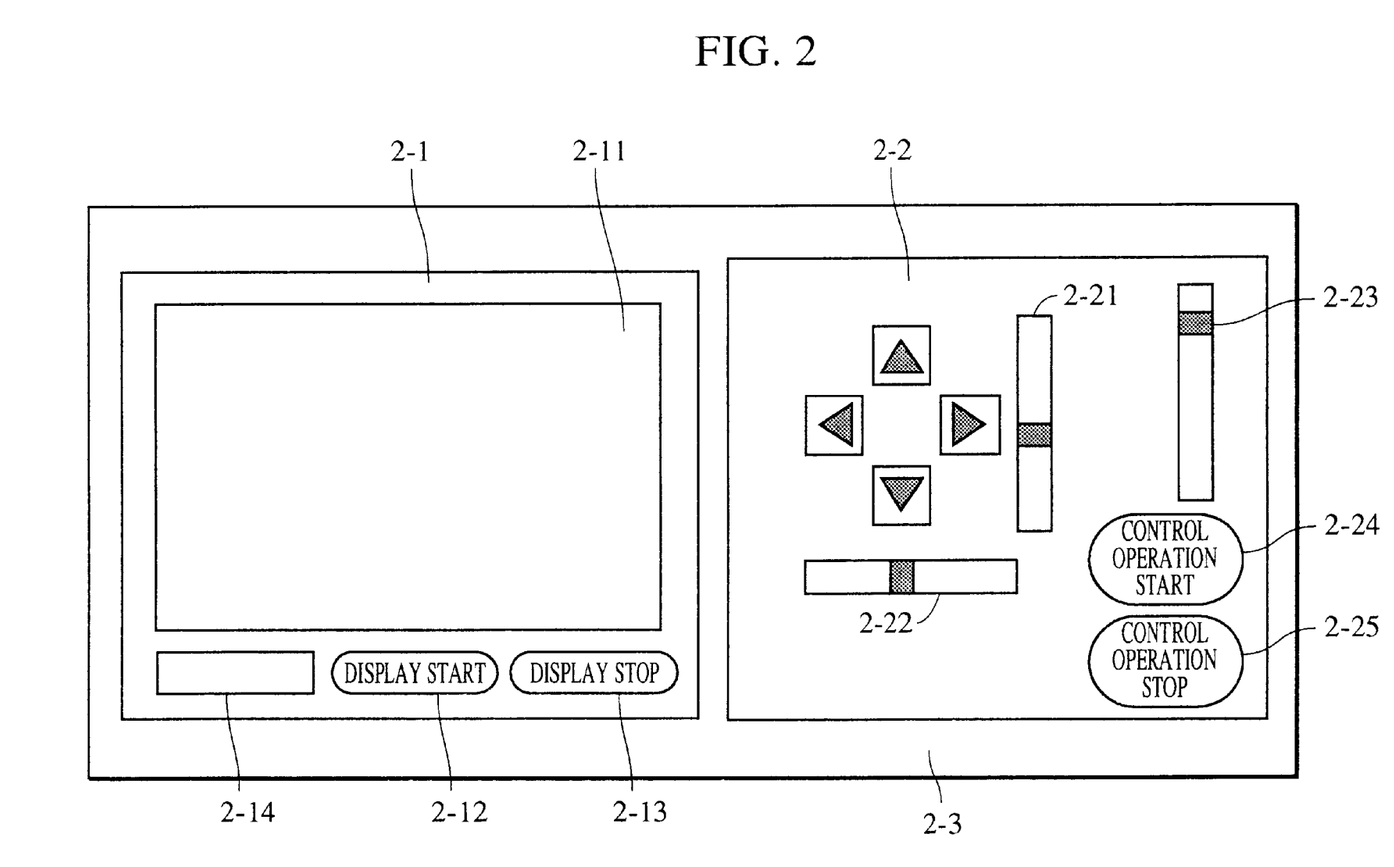
FIG. 2 is a schematic diagram illustrating an example of an image displayed on the screen of a display/operation terminal according to the embodiments of the invention.

FIG. 2 illustrates an example of a graphical user interface (GUI) provided on the screen of the display/operation terminal 1-4M.

As shown in FIG. 2, an image display window 2-1 includes an image display area 2-11, a display start button 2-12, a display stop button 2-13, and an address designating box 2-14. If the user designates the address of a desired camera server via the address designating box 2-14 and then operates (clicks) the display start button 2-12, the designated address is transmitted to the network 1-5 via the communication server 1-411. As a result, the display/operation terminal is connected to the reception/control unit 1-1 via the network 1-5, and a video signal transmitted from the desired camera server of the set of camera servers under the control of the reception/control unit 1-1 is received and displayed on the video display 2-11. If the display stop button 2-13 is clicked, the operation of receiving and displaying the video signal is stopped.

In FIG. 2, there is also provided a camera control window 2-2. The user can control the camera operation by operating buttons or scroll bars displayed in the camera control window 2-2 via the pointing device or the like of the operation control unit 1-413. The up, down, right, and left arrow keys and also the scroll bars 2-21 and 2-22 in the window 2-2 are used to designate the panning and tilting angle of a video camera to be controlled. The scroll bar 2-23 is used to designate the zoom ratio of the camera. These buttons and scroll bars become enabled when permission to operate the camera is obtained by pressing the camera control start button 2-24. If the operations of these buttons and scroll bars are accepted by the operation control unit 1-413, the operation control unit 1-413 transfers the operation input data to the command generator 1-412. The command generator 1-412 interprets the received operation input data and generates a corresponding control command.

Although the Internet is employed as the network 1-5 in this specific embodiment, any communication line or network may be employed for the same purpose as long as it has a sufficient capacity to transmit control data and video signal data. The reception/control unit, the camera servers, and the display/operation terminals have their own network address such as IP address uniquely assigned to them so that they can be identified by their address.

Figures 3, 3B:
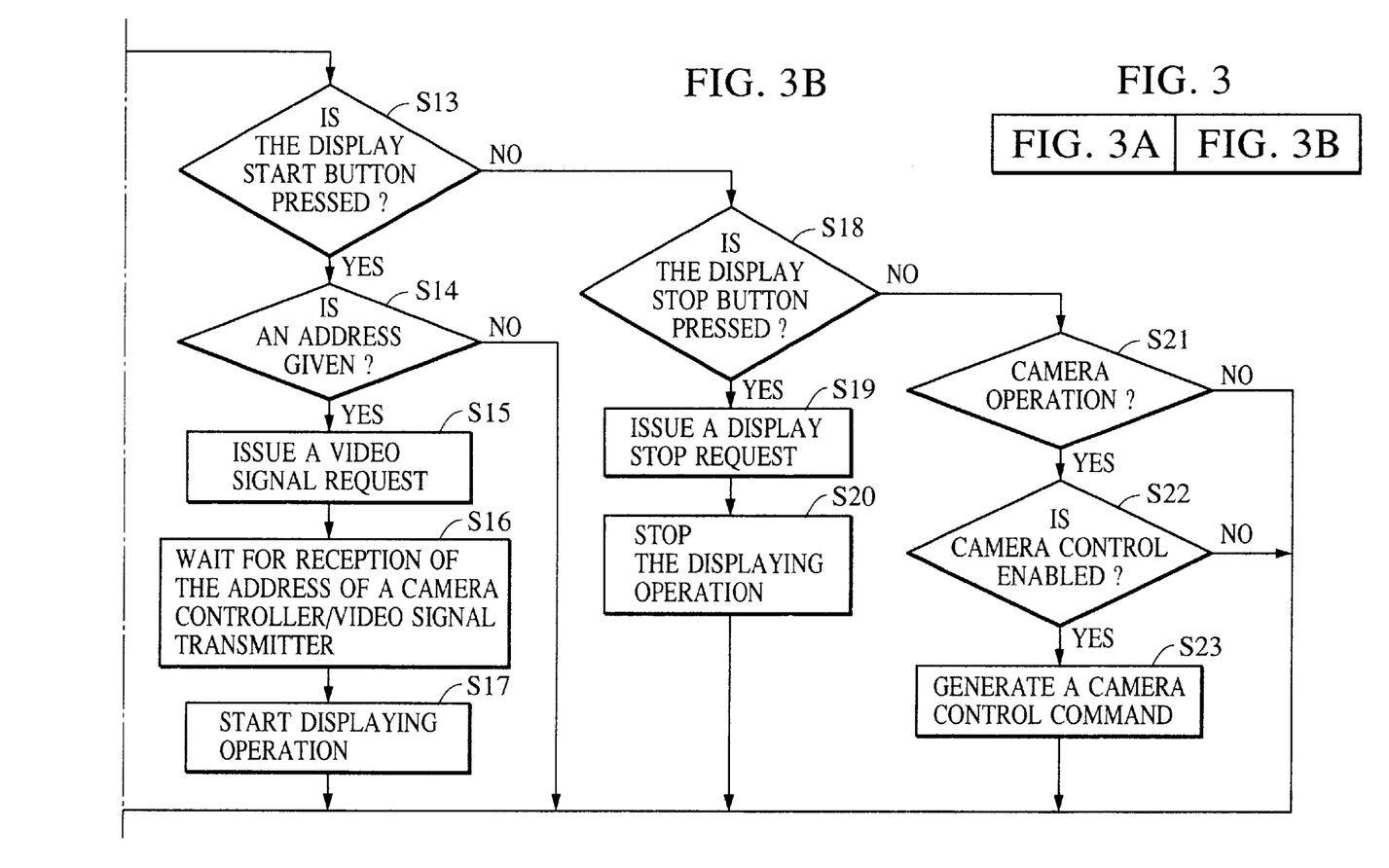
FIG. 3 is a flowchart illustrating the process associated with the display/operation terminal according to the embodiments of the invention.
Figure 3A:
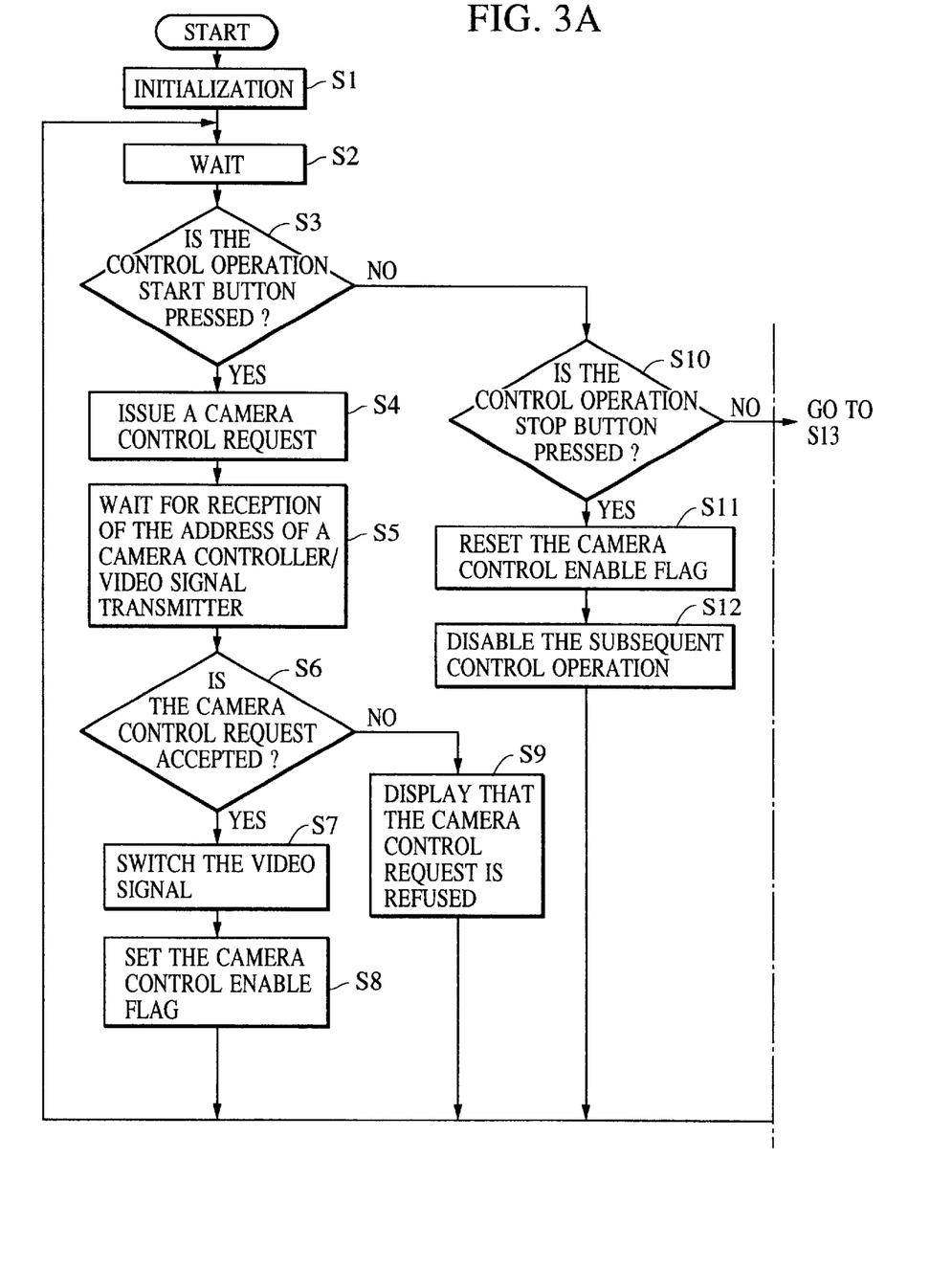
Figure 4:
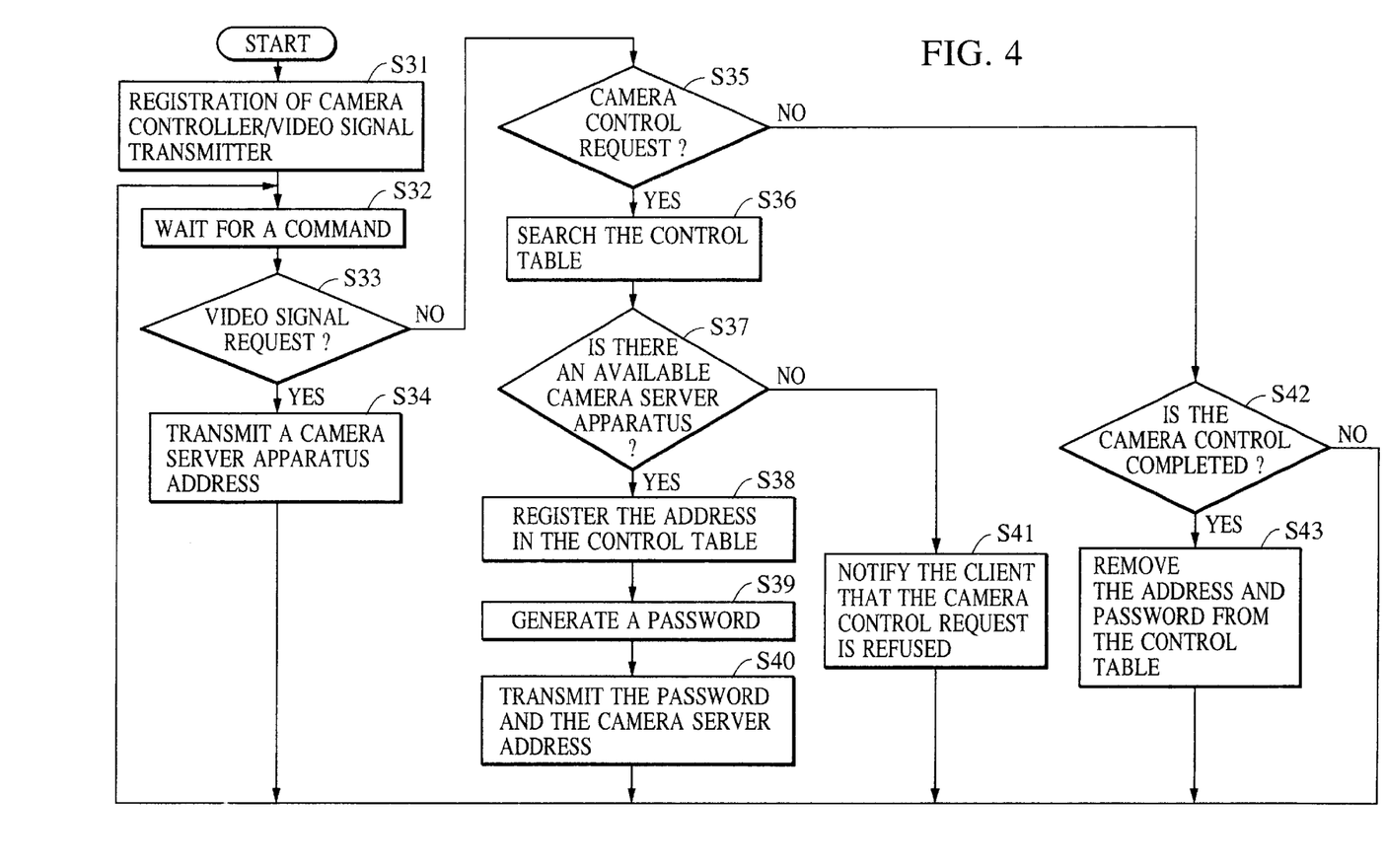
FIG. 4 is a flowchart illustrating the process associated with a reception/control unit according to the embodiments of the invention.
Figure 5:
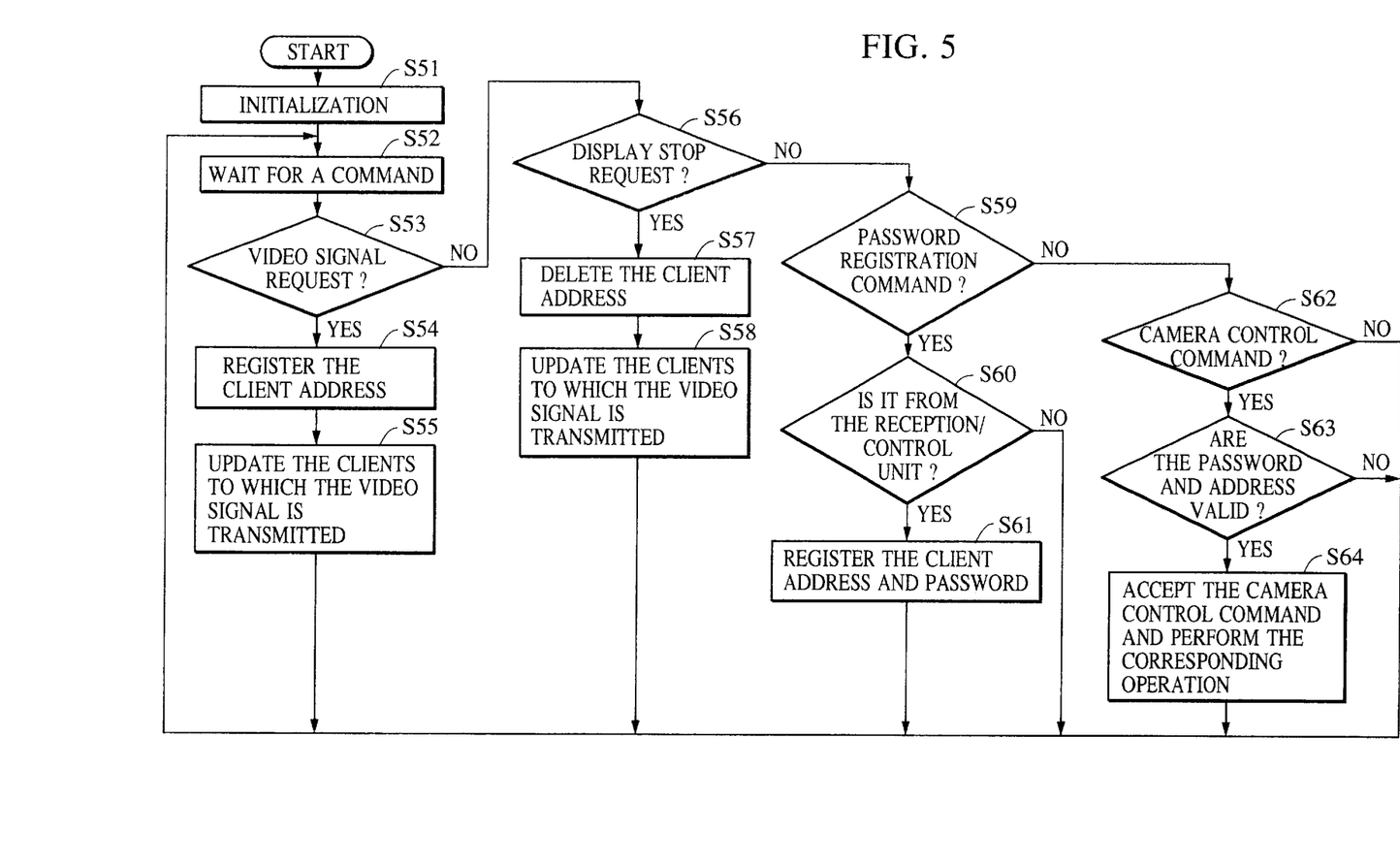
FIG. 5 is a flowchart illustrating the process associated with a camera server according to the embodiments of the invention.

FIGS. 3, 4, and 5 are flowcharts illustrating the operation of the display/operation terminal, the reception/control unit, and the camera server according to the present embodiment. Although a plurality of display/operation terminals, reception/control units, and camera servers are connected to the network 1-5, they are similar in operation and thus the particular display/operation terminal 1-41, the reception/control unit 1-1, and the camera server 1-31 are referred to in the following description.

First, the operation of displaying an image is described.

Figure 6:
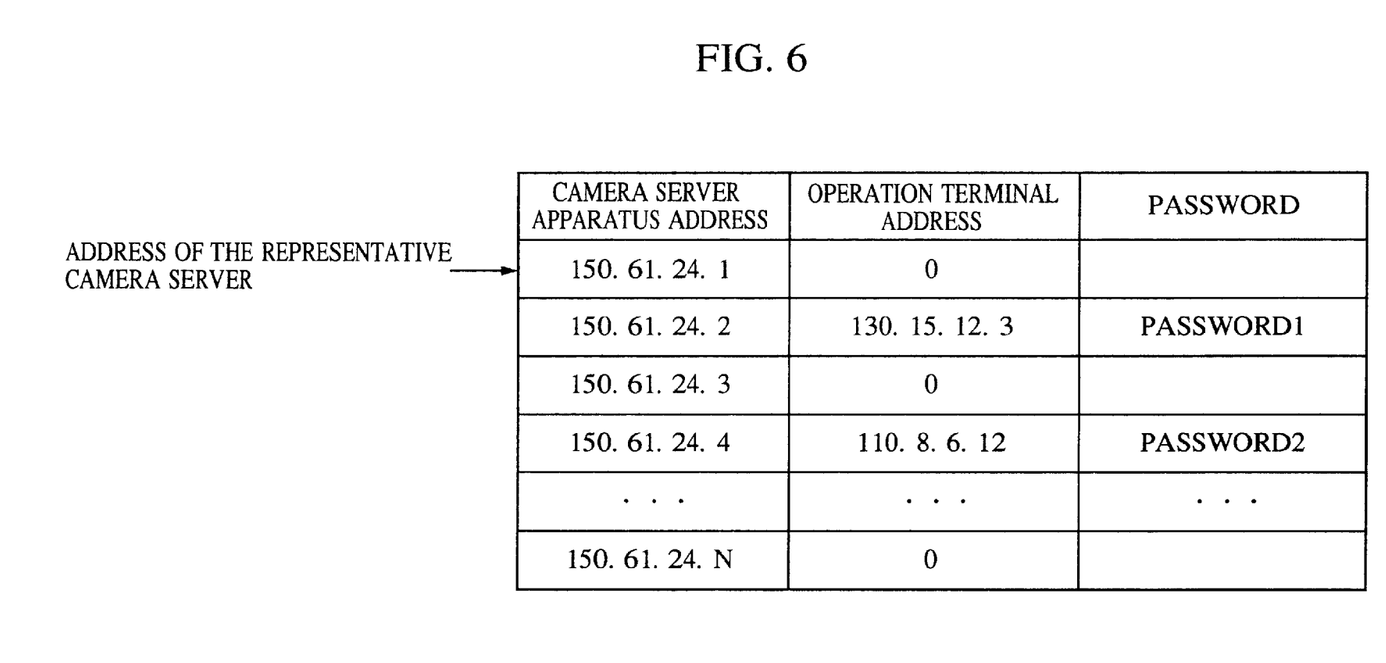
FIG. 6 is a schematic illustration of a control table associated with camera servers which are controlled by the reception/control unit according to the embodiments of the invention.

In the reception/control unit 1-1, at step S31 in FIG. 4, the addresses of camera servers (1-31 to 1-3N) under the control of the reception/control unit 1-1 are registered in the control table 1-104 of the camera server controller 1-102 wherein the registration is performed in the format shown in FIG. 6. Then in step S32, the reception/control unit 101 waits for a command from some display/operation terminal 1-41 to 1-4n. The addresses shown in FIG. 6 are given in the form of the IP address employed in the Internet. Of the digits separated by periods ("."), the first set of three digits represents the network to which a particular server or operation terminal is connected, and the last digit represent a numeral uniquely assigned to that server or the operation terminal.

Referring to FIG. 6, the format of data registered in the control table 1-104 will be described in further detail below. The left field indicates the address of a particular camera server. If the video camera connected to that camera server is controlled by a particular display/operation terminal, the address of that display/operation terminal is registered in the middle field, and the password of that display/operation terminal is registered in the right field. On the other hand, if the camera server is not controlled by any particular display/operation terminal, "0" is given in the display/operation terminal field of the address of the camera server, and no data is given in the password field. In the top row, the address of the representative camera server of the set of camera servers and the address of a display/operation terminal which is controlling the representative camera server (if there is such a display/operation terminal) are registered.

Referring to the flowchart of FIG. 3, the operation of a display/operation terminal is described. When the display/operation terminal 1-41 is powered on, initialization is performed at the first step S1, and windows appear on the screen of the display/operation terminal 1-41 as shown in FIG. 2. Then in step S2, the process waits for an operation to be performed by a user via the GUI. If in step S3, the network address of the reception/control unit 1-1 is input in the address designating box 2-14 and the display start button 2-12 is clicked, the process goes from step S3 to steps S13 and S14. In step S14, it is checked whether the address given in the address designating box 2-14 is valid or not. If yes, then the process goes to step S15 in which a video signal request command is transmitted to the reception/control unit 1-1 having the designated address. Then the process waits for a response from the reception/control unit 1-1 (in step S16).

In the reception/control unit having the designated address (herein it is assumed that the reception/control unit 1-1 is designated), if the video signal request command transmitted from the display/operation terminal 1-41 has arrived (in step S33), the process goes to step S34 in which the address of the representative camera server (1-31 in the specific example shown in FIG. 1) of those under the control of the reception/control unit 1-1 is returned.

If the address of the camera server 1-31 specified as the representative camera server is returned by the reception/control unit 1-1, the process goes from step S16 to S17 in which a video signal transmission request is issued to the specified camera server 1-31. After that, a compressed video signal is received from the specified camera server 1-31, and is decompressed by the video signal decompression circuit 1-414. The decompressed video signal is displayed on the video display 1-415.

Instead of the representative camera server, an arbitrary camera server may be selected from the camera servers which is under the control of the reception/control unit 1-1, and the video signal from the selected camera server may be displayed. In this case, the address of the selected camera server is transmitted to the client.

In this case, the camera server operates as described below referring to the flowchart of FIG. 5.

The camera server is waiting for a command in step S52 after the initialization has been performed in step S51. If the camera server receives the video signal request command from the display/operation terminal via the network 1-5, the process goes from step S53 to S54 and the address of the display/operation terminal which has issued that video signal request command is registered in the client address list 1-3151. Then in step S55, an image is sensed by the video camera 1-21 and the video signal is compressed by the video signal compressing circuit 1-312. Then the transmission of the compressed video signal is started (in step S55). The camera server may transmit a video signal simultaneously to a plurality of display/operation terminals registered in the client address lists 1-3151.

When the image is being displayed on the display/operation terminal, if the user wants to stop the operation of displaying the image, the user presses the display stop button 2-13 in the display window 2-1. Then the process goes from step S2 to steps S18 and S19 in the flowchart of FIG. 3, and the display/operation terminal issues a video signal stop command to the representative camera server 1-31 of the set of camera servers from which the video signal is transmitted. The operation of displaying the image is stopped in step S20.

If the representative camera server 1-31 receives the video signal stop command, the process goes from step S56 to step S57 (FIG. 5). In step S57, the address of the display/operation terminal which has issued the video signal stop command is deleted from the client address list 1-3151, and the clients to which the video signal is transmitted is updated in step S58.

Now, control of the operation of a video camera is described below.

Herein, it is assumed that the display/operation terminal 1-41 is displaying a received video image after performing the above-described process.

In the display/operation terminal 1-41 shown in FIG. 3, if the camera control start button 2-24 displayed in the camera control window 2-2 is clicked, the process goes from step S3 to S4 and the display/operation terminal 1-41 issues a camera control permission request to the reception/control unit 1-1. Then in step S5, the process waits for arrival of an address from the reception/control unit.

Referring to the flowchart of FIG. 4, if the reception/control unit 1-1 receives the camera control permission request in step S35, the process goes to step S36 to retrieve a camera server having a value of 0 in the entry of the operation terminal address (not in operation) from the camera server control table 1-104 (FIG. 6). In step S37, if a camera server having a value of 0 in the entry of the operation terminal address is found, then the process goes to step S38 and the address of the display/operation terminal 1-41 which has issued the camera control permission request is registered in the control table 1-104 shown in FIG. 6. Then in step S39, a password which is unique over the entire network is generated in this control session and the resultant password is registered in the control table 1-104. The information about the password and the address of the corresponding camera controller (herein the camera controller 1-3$i$ is assumed to be such a camera controller) is supplied to the display/operation terminal 1-41 which has issued the camera control permission request. At the same time, the reception/control unit 1-1 issues a password registration command to the camera server 1-3$i$. In response, the camera server 1-3$i$ registers the above password and the address of the display/operation terminal 1-41 which has issued the camera control permission request.

On the other hand, if it is concluded in step S37 that there is no available camera server (that is, all N video cameras are being used), then the process goes to step S41 to notify the display/operation terminal 1-41, which has issued the request, of the fact that the camera control permission request is refused. This occurs when the reception/operation unit 1-1 receives camera control permission requests from a greater number of clients than the number (N) of camera servers provided in the set of camera servers. In this case, the display/operation terminal 1-41 which has issued the request waits until some camera server becomes available, and again clicks the camera control button in the camera control window 2-2 displayed on the screen of the display/control terminal so as to access the camera server.

A specific example of the processing steps S38–S40 performed by the reception/control unit 1-1 is described below. It is assumed here that camera control permission has been given to a display/operation terminal having an address of 33.44.55.66. In FIG. 6, the field of the display/operation terminal address corresponding to the camera server in the third row (the camera server 1-33 having an address of 150.61.24.3) is filled with a value of "0" which means that the camera of this camera server is free and can accept a camera control permission request. If the camera control permission request is accepted, the content of the display/operation terminal address field in FIG. 6 is updated to 33.44.55.66. Furthermore, a password (PASSWORD3 in this case) is generated (in step S39) and registered in the password field in FIG. 6. Then the address "150.61.24.3" of the camera server 1-33 and the password "PASSWORD3" are returned to the display/operation terminal (having the address of 33.44.55.66) which has issued the camera control permission request. At the same time, The password "PASS-WORD3" and the address "33.44.55.66" of the display/operation terminal to which the camera control permission has been given are transmitted from the reception/control unit 1-1 to the camera server (with the address 150.61.24.3).

Then a password registration process is performed in steps S59–S61 in FIG. 5. That is, if the camera server 1-33 receives a password registration command, the camera server 1-33 checks whether the command is from the reception/control unit 1-1 by comparing the address of the reception/control unit from which the password has come with the address of the reception/control unit 1-1 (steps S59 and S60). If it is concluded that the command is from the reception/control unit 1-1, the camera server 1-33 accepts the address (33.44.55.66 in this case) of the display/operation terminal or the client and the associated password (PASSWORD3 in this case) contained in the password registration command, and registers them in the memory 1-336 (step S61).

On the other hand, the display/operation terminal 1-41 is waiting for a response to the request in step S5 in FIG. 3. If the display/operation terminal 1-41 receives the address "150.61.24.3" of the camera server 1-33 and the associated password "PASSWORD 3", it stores these data in the memory 1-417 (step S5). In the case where the display/operation terminal 1-41 receives information telling that the camera control permission request has been refused, the process goes to step S9 in which an indication is given to notify the user that the camera control permission request has been refused, and then the process returns to step S2 so as to wait for another operation command.

On the other hand, if the camera control permission request is successfully accepted in step S6, then the process goes to step S7 and the display/operation terminal 1-41 issues a display stop command to the reception/control unit 1-1 so that the displaying of the image transmitted from the representative camera server 1-31 of the set of camera servers is stopped. Subsequently, because control permission for camera server 1-33 has been given to the display/operation terminal 1-41, the display/operation terminal 1-41 issues a video signal transmission request to the camera server 1-33 so as to switch the image to that received from the camera server 1-33 having the address 150.61.24.3. Thus, the image is switched to that received from the camera server 1-33. An indication is given to notify that the operation is in the process of switching the image (step S7), and the camera control enable flag is set (step S8). Thus, the control session is established, and the display/operation terminal is allowed to operate the camera until the camera operation stop button 2-25 is clicked (steps S21–S23).

In the command generator 1-412 of the display/operation terminal 1-41, if some operation is performed via the GUI in the camera control window 2-2 in step S21, the process goes to step S22 so as to check whether the camera control permission is given or not by referring to the camera control enable flag. If it is concluded that the display/operation terminal 1-41 has camera control permission, then the process goes to step S23 and the command generator 1-412 issues a camera control command corresponding to the above operation performed via the GUI. The camera control command is transmitted together with the address "33.44.55.66" of the display/operation terminal 1-41 and the password "PASSWORD3" to the address "150.61.24.3" of the camera server 1-33 stored in the display controller 1-416 of the display/operation terminal 1-41.

If the camera server 1-33 receives the camera control command issued by the camera control operation at the display/operation terminal 1-41, it compares the password and the address of the display/operation terminal contained in the camera control command with the password and the address of the display/operation terminal stored in the memory 1-316 of the camera server 1-33. If the password and the address are valid, the camera control command is accepted and interpreted by the command interpreter 1-333. In accordance with the result of the interpretation of the camera control command, the camera controller 1-334 controls the video camera 1-23. In the process described above, the reception/control unit 1-1 determines the password in such a manner that the password varies from one control session to another.

When the user at the display/operation terminal wants to stop the camera control operation (i.e., discontinue the camera control permission), the user clicks the camera operation stop button 2-25 in the camera control window 2-2. In response, the process goes from step S10 to S11 in the flowchart of FIG. 3, in which the camera control enable flag of the display controller 1-416 is reset. Furthermore, the display/operation terminal 1-41 sends a message to the reception/control unit 1-1 of the set of camera servers to tell that the camera control operation has been ended. In the display/operation terminal 1-41, camera control operations performed after the camera control enable flag has been reset are refused (S12).

On the other hand, on reception of the message telling that the camera control operation has been ended, the reception/control unit 1-1 deletes the password and the address of the display/operation terminal from the control table shown in FIG. 6 (step S43). At the end of this control session, the video camera connected to the camera server is reset to its initially programmed settings.

In the present embodiment, the representative camera server is not controlled by clients. Alternatively, the representative camera server may be controlled by clients. For example, a particular client (display/operation terminal) may have a special permission to control the representative camera server so that the orientation and the zoom ratio of the video camera of the representative camera server are controlled in accordance with a request from the particular client. In this case, the initial camera position to which the video camera is reset at the end of each camera control session may be varied in accordance with the position of the video camera of the representative camera server. Whenever the initial camera position of the representative camera server is varied, the representative camera server sends information about the orientation and the zoom ratio of its video camera to the other camera servers in the set of camera servers so that the initial camera position of each video camera is updated.

In this first embodiment, since a plurality of video cameras are set to the initial position so that every video camera senses the same image, the plurality of video cameras behave as if there were only a single video camera. This eases the problem of competition among a plurality of clients in the access to video cameras. In this system according to the invention, any client can view a normal image simply by receiving a video signal from the representative camera server of the set of camera servers and also can control the video camera by accessing a camera server specified by the reception/control unit of the set of the camera servers wherein a plurality of clients can access some camera server of the set of the camera servers as if they accessed simultaneously the same single camera server and were controlling the single camera server independently.

Second Embodiment

In the first embodiment described above, the representative camera server is fixed to a particular camera server of the set of camera servers. When a video camera control permission request is issued by a display/operation terminal, the camera servers are searched for an available camera server which is not controlled by any clients. The second embodiment described below is similar to the first embodiment in many respects. However, there are some differences as will be described below with reference to the flowchart of FIG. 7.

In this second embodiment, a control session may also be established in the representative camera server. The control process proceeds as follows.

(1) When a display/operation terminal seeks to control a video camera, the process goes to steps S35 and S36 in which the reception/control unit 1-1 specifies an available camera server other than the representative camera server and returns the information about the address of the camera server to a display/operation terminal that has issued a video camera control permission request, (2) In step S37, if no available camera server is found in the set of camera servers, the process goes to step S71 in which permission of controlling the representative camera server is given to the display/operation terminal. Then steps S38–S40 in FIG. 4 are performed. In this situation, no camera server acts as the representative camera server any longer.

Figure 7:
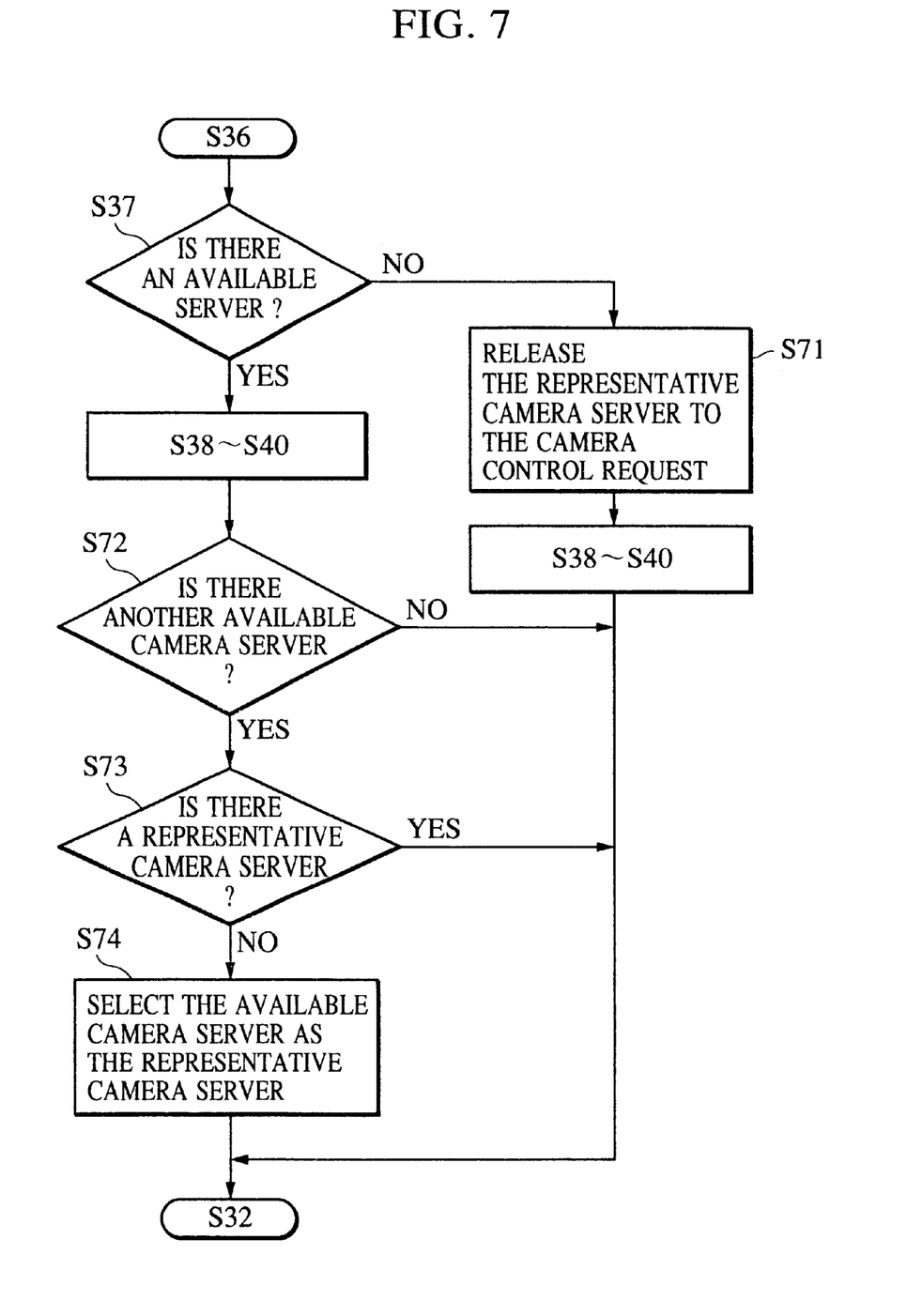
FIG. 7 is a flowchart illustrating the process associated with a reception/control unit according to a second embodiment of the invention.

(3) In step S72, it is checked whether there is a camera server which is free and is not controlled by any client. If there is such a camera server, then in step S73 it is further checked whether there is a camera server acting as the representative camera server. If there is no camera server acting as the representative camera server, then the process goes to step S74 and the camera server which has been found to be free is selected as the representative camera server of the set of camera servers.

(4) When a video signal transmission request is issued by some client, the client is connected to the representative camera server in step S34 in FIG. 4.

In this second embodiment, however, the representative camera server is not fixed to a particular camera server in the set of camera servers, as described above. Therefore, unlike the first embodiment in which the address in the first entry in FIG. 6 is employed as the address of the representative camera server, the second embodiment includes a further means or a process in step S34 in which the entry number corresponding to the representative camera server is stored in a memory and this entry number is referred to so as to find a camera server acting as the representative camera server. There is a possibility that no camera servers act as the representative camera server, as described above. If a video signal transmission request is issued by a user when there is no representative camera server, the user may select some video camera.

In the second embodiment, as described above, all video cameras in the set of camera servers can be controlled, and therefore one more video camera is used in a more efficient manner.

Third Embodiment

Figure 8:
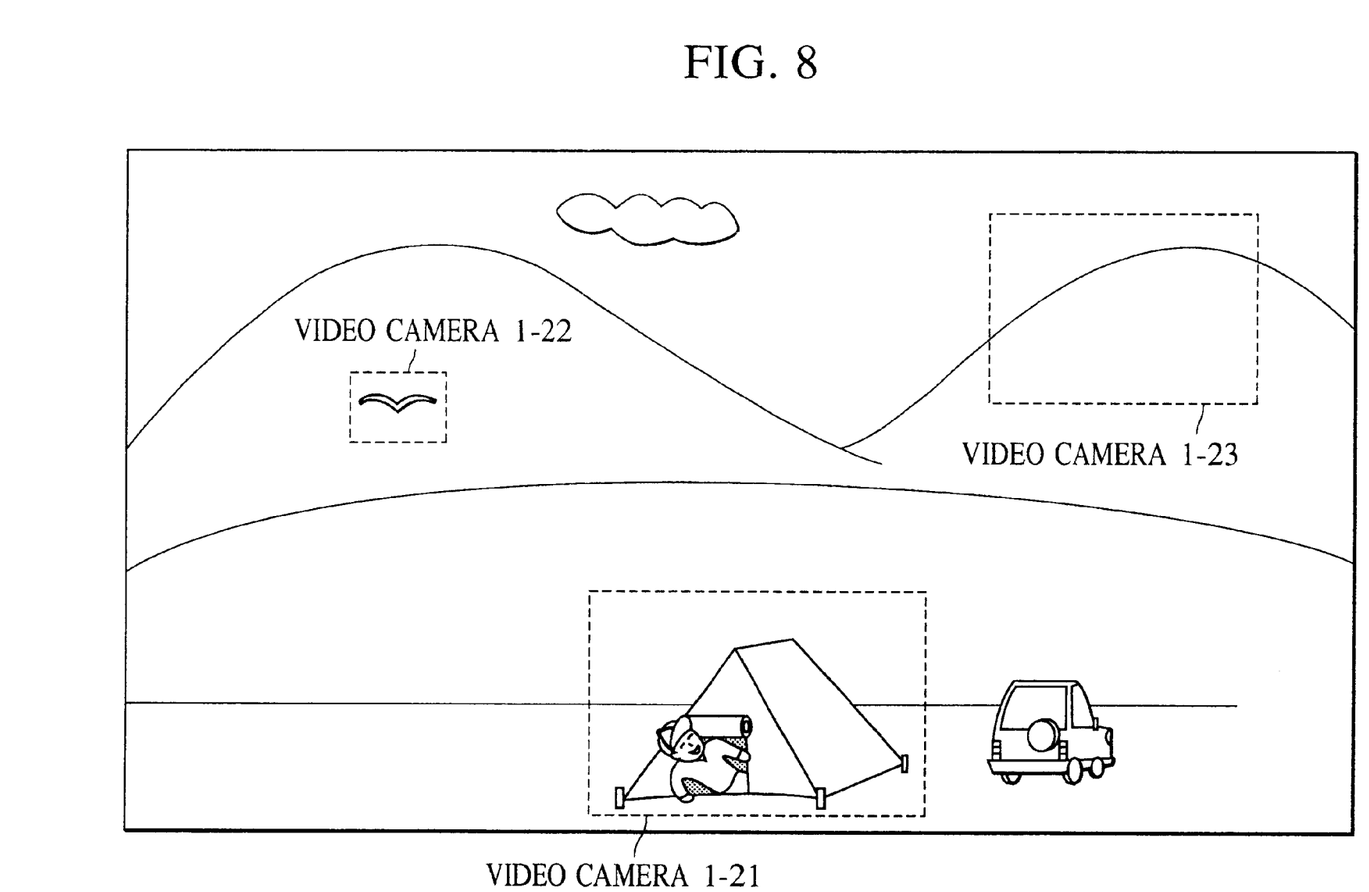
FIG. 8 is a schematic diagram illustrating an example of a panoramic image according to a third embodiment of the present invention.

In this third embodiment, as shown in FIG. 8, a panoramic image (still image) is generated so that the panoramic image includes the fields of view of all cameras including that of the representative camera server. The field of view of each camera is indicated on the panoramic image so that a user can access a video camera sensing a desired part of the panoramic image.

In the initialization process, the video camera of the representative camera server, which is adapted to be controlled, is set to a zoom ratio corresponding to the widest angle, and a still image is sensed while properly controlling the panning and tilting angles of the video camera thereby generating a panoramic image including the entire area which can be covered by the video camera of the representative camera server. The obtained panoramic image is stored in the control apparatus 1-102 of the reception/control unit 1-1.

When a display/operation terminal accesses the reception/control unit 1-1, the panoramic image is first downloaded and displayed on the screen 2-3. Whenever some camera server (1-31 to 1-3N) which is under the control of the reception/control unit 1-1 receives a camera control command, the camera server sends information about the current panning and tilting angles and the zoom ratio of the video camera to all display/operation terminals which are registered as current clients in the reception/control unit 1-1. If the display/operation terminals receive the information about the current panning and tilting angles and the zoom ratio of the video camera from a plurality of camera servers, each display/operation terminal creates image frames corresponding to the respective image areas sensed by the video cameras 1-21, 1-22, 1-23, . . . , 1-2N, and displays the image frames on the panoramic image in a superimposed fashion. Thus, each user at his/her display/operation terminal can obtain information about the field of view for all camera servers of the set of camera servers. The user can select any desired video camera by clicking the corresponding image frame so as to request the selected video camera to transmit the video signal or so as to request permission to control the selected video camera.

In the third embodiment, as described above, clients can obtain rough information about the image areas of all camera servers in the set of camera servers and therefor clients can easily select a video camera corresponding to a desired image area.

The embodiments of the present invention may be applied to various types of systems which may include either a plurality of devices (such as a host computer, interfaces, reader, printer, etc.) or a single device (such as a copying machine or a facsimile machine).

Furthermore, the objects of the embodiments of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of the embodiment of the present invention and thus the storage medium storing the program code falls within the scope of present invention.

Storage media which preferably can be employed in the embodiments of the present invention to supply the program code include a floppy disk, hard disk, optical disk, magneto-optical disk, CD-ROM, CD-R, magnetic tape, non-volatile memory card, and ROM.

Furthermore, the scope of the embodiments of the present invention includes not only such a system in which the functions of any embodiment described above is implemented simply by reading and executing a program code on a computer but also a system in which a part of or the whole of the process instructed by the program code is performed using an OS (operating system) on the computer.

Furthermore, the scope of the embodiments of the present invention also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

When the embodiments of the present invention are practiced with a storage medium, the program code corresponding to the process described above with reference to the flowcharts is stored in the storage medium.

In the embodiments of the present invention, as described above, a plurality of video cameras are initialized so that they sense an image of a certain part of a subject thereby making it possible for a plurality of clients to control the video cameras in such a manner as if there were only a single video camera and thus easing the problem of competition among the plurality of clients in access to the video cameras.

Furthermore, in the embodiments of the present invention, it is possible to perform image sensing operations in an efficient manner in response to video data transmission requests or video camera control requests from a plurality of clients.

The individual components mentioned or designated by blocks in the drawings are all well-known in the art of imaging control systems and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Furthermore, in the embodiments of the present invention, competition among a plurality of clients in access to video cameras to control them is avoided so that the video cameras may be controlled in response to requests of the respective clients.

What is claimed is:

1. A managing apparatus for managing a plurality of camera servers, each camera server having a video camera and a controller for controlling the video camera, said managing apparatus comprising:

receiving means for receiving a camera control permission request transmitted from a client via a network;

retrieving means for retrieving a camera server, having a video camera which is not controlled by another client, from the plurality of camera servers in response to receiving the camera control permission request; and selecting means for selecting the camera server retrieved by said retrieving means as an object for connecting with a client who transmitted the camera control permission request.

2. An apparatus according to claim 1, further comprising notifying means for supplying information about which client has issued the video camera control permission request to the camera server selected by said selecting means.

3. An apparatus according to claim 1, further comprising first notifying means for supplying information to the client about which camera server has been selected by said selecting means.

4. An apparatus according to claim 3, further comprising second notifying means for supplying information about which client has issued the video camera control permission request to the camera server selected by said selecting means.

5. An apparatus according to claim 4, wherein said first notifying means further notifies said client of a password used to control the camera server selected by said selecting means, and wherein said second notifying means further notifies said camera server of the same password.

6. An apparatus according to claim 1, further comprising controlling means for (i) selecting one camera server from the plurality of camera servers in response to said receiving means receiving a video signal transmission request, and (ii) transmitting the video signal generated by the selected camera server to the client that issued the control command.

7. An apparatus according to claim 1, further comprising video signal distributing means for (i) selecting a first camera server from the plurality of camera servers in response to said receiving means receiving the control command that comprises a video signal transmission request, and (ii) distributing the video signal generated by said first camera server to the client that has issued the control command.

8. An apparatus according to claim 1, further comprising a table for storing information about each video camera of the plurality of camera servers that are currently being used by the clients, and wherein said retrieving means retrieves a camera server having a video camera that is not currently being used by referring to said table.

9. An apparatus according to claim 8, wherein said table stores the addresses of the plurality of camera servers and also the addresses of clients by which respective camera servers are controlled.

10. An apparatus according to claim 1, wherein said video camera is capable of being controlled in terms of a camera orientation and zoom ratio, in response to an external command.

11. A method of managing a plurality of camera servers, each including a video camera and a controller for controlling said video camera, comprising the steps of:
   receiving a control command transmitted from a client via a network;
   interpreting the control command received in said receiving step;
   retrieving a camera server having a video camera that is not controlled by another client, from the plurality of camera servers, if in said interpreting step said command is interpreted as a video camera control permission request; and
   selecting the retrieved camera server as an object for connecting with a client who transmitted the camera control permission request.

12. A method according to claim 11, said method further comprising a notifying step in which information about which client has issued the video camera control permission request is supplied to the camera server selected in said selecting step.

13. A method according to claim 11, further comprising a first notifying step in which information about which camera server has been selected in said selecting step is supplied to the client.

14. A method according to claim 13, further comprising a second notifying step in which information about which client has issued the video camera control permission request is supplied to the camera server selected in said selecting step.

15. A method according to claim 14, wherein said first notifying step further comprises the step of notifying said client of a password used to control the camera server selected in said selecting step, and wherein said second notifying step further comprises the step of notifying said camera server of the same password.

16. A method according to claim 11, further comprising a transmitting step in which, if the control command is interpreted as a video signal transmission request in said interpreting step, one camera server is selected from the plurality of camera servers, and the video signal generated by the selected camera server is transmitted to the client that has output said control command.

17. A method according to claim 11, further comprising a video signal distributing step in which, if said control command is interpreted as a video signal transmission request in said interpreting step, a first camera server is selected from said plurality of camera servers and the video signal generated by s aid first camera server is distributed to the client that has output said control command.

18. A method according to claim 11, wherein a camera server having a video camera that is not currently used by the clients is selected by referring to a table storing the information about each camera of the plurality of camera servers that are currently being used by the clients.

19. A method according to claim 18, wherein said table stores the addresses of said plurality of camera servers and also the addresses of clients by which respective camera servers are controlled.

20. A method according to claim 11, wherein said video camera is capable of being controlled in terms of camera orientation and zoom ratio in response to an external command.

21. A method according to claim 11, further comprising the steps of:
   outputting a panoramic image to the client, said panoramic image being generated by varying the viewing angle of a camera server of the plurality of camera servers;
   transmitting information about a camera parameter including at least one of the orientation of the camera and the zoom ratio of the camera; and
   displaying the image displaying areas corresponding to camera parameters received from the plurality of camera servers in such a manner that said image displaying areas are superimposed on said panoramic image.

22. A storage medium for storing a computer-readable program in accordance with which a managing apparatus performs a process for managing a plurality of camera servers each including a video camera and a controller for controlling said video camera, said program causing the apparatus to perform the steps of:
   receiving a control command transmitted from a client via a network;
   interpreting the received control command;
   retrieving a camera server having a video camera which is not controlled by another client, from the plurality of camera servers, if in said interpreting step the command is interpreted as a video camera control permission request; and
   selecting the retrieved camera server as an object for connecting with a client who transmitted the camera control permission request.

23. A storage medium according to claim 22, said program further causing the apparatus to notify said client which camera server is selected.

24. A storage medium according to claim 22, said program further causing the apparatus to notify said selected camera server which client has issued the video camera control permission request.

25. A storage medium according to claim 23, said program further causing the apparatus to notify said selected camera server which client has issued the video camera control permission request.

26. A storage medium according to claim 25, wherein said program causes said apparatus to notify said client of a password used to control the selected camera server, and to notify the camera server of the same password.

27. A storage medium according to claim 22, said program further causing said apparatus to, if said control command is interpreted as a video signal transmission request in said interpreting step, select one camera server from said plurality of camera servers, and transmit the video signal generated by said selected camera server to the client that has output said control command.

28. A storage medium according to claim 22, said program further causing said apparatus to, if said control command is interpreted as a video signal transmission request in said interpreting step, select a first camera server from said plurality of camera servers and distribute the video signal generated by said first camera server to the client that has output said control command.

29. A storage medium according to claim 22, wherein said program causes said apparatus to select a camera server having a video camera that is not currently used by the clients by referring to a table storing the information about each camera of said plurality of camera servers that are currently being used by the clients.

30. A managing apparatus for managing a plurality of image pickup apparatuses, each of which can be controlled by a client, comprising:
    a retrieving unit that retrieves an image pickup apparatus which is not controlled by another client, from among the plurality of image pickup apparatuses, in response to a control permission request by the client; and
    a selecting unit that selects the image pickup apparatus retrieved by said retrieving unit as an object for connecting with the client.

31. An apparatus according to claim 30, wherein said selecting unit notifies the client of a password to control the image pickup apparatus selected by said selecting unit.

32. An apparatus according to claim 30, wherein said selecting unit selects one image pickup apparatus from the plurality of image pickup apparatuses in response to receive of a video signal transmission request by said A receiving unit.

33. An apparatus according to claim 30, further comprising a table for storing information about each of the plurality of image pickup apparatuses that is currently being used by another client, and wherein said retrieving unit retrieves an image pickup apparatus that is not currently being used by another client by referring to said table.

34. An apparatus according to claim 30, wherein each of the plurality of image pickup apparatuses has controllable functions including image pickup direction and zoom ratio, and the client controls such functions.

35. A method of managing a plurality of image pickup apparatuses each of which is controllable by a client, comprising the steps of:
    retrieving an image pickup apparatus which is not controlled by another client, from the plurality of image pickup apparatuses, in response to a control permission request by the client; and
    selecting the image pickup apparatus retrieved by said retrieving step as an object for connecting with the client.

36. A method according to claim 35, further comprising the step of notifying the client of a password to control the image pickup apparatus selected in said selecting step.

37. A method according to claim 35, further comprising the step of selecting, from the plurality of image pickup apparatuses, one image pickup apparatus for outputting a video signal to the client, in response to receiving a video signal transmission request by the client.

38. A method according to claim 35, further comprising the step of referring to a table for storing information about each of the plurality of image pickup apparatuses that is currently being used by another client, and retrieving the image pickup apparatus based on a result of the referring step.

39. A method according to claim 35, wherein each of the plurality of image pickup apparatuses has controllable functions including image pickup direction and zoom ratio, and the client controls such functions.

40. A storage medium for storing a computer-readable program for managing a plurality of image pickup apparatuses each of which is controllable by a client, said computer-readable program causing the performance of the following steps.
    retrieving an image pickup apparatus which is not controlled by another client, from the plurality of image pickup apparatuses, in response to a control permission request by the client; and
    selecting the image pickup apparatus retrieved by said retrieving step as an object for connecting with the client.

41. A storage medium according to claim 40, wherein the computer-readable program further causes the step of notifying the client of a password to control the image pickup apparatus selected in the selecting step.

42. A storage medium according to claim 40, wherein the computer-readable program further causes the step of selecting, from the plurality of image pickup apparatuses, one image pickup apparatus for outputting a video signal to the client, in response to receiving a video signal transmission request by the client.

43. A storage medium according to claim 40, wherein the computer-readable program further causes the step of referring to a table storing information about each of the plurality of image pickup apparatuses that is currently being used by another client, and retrieving the image pickup apparatus based on a result of the referring step.

44. A storage medium according to claim 40, wherein each of the plurality of image pickup apparatuses has controllable functions including an image pickup direction and zoom ratio, and the computer-readable program causes the client to control such functions.

* * * * *

UNITED STATES PATENT AND TRADEMARK OFFICE
CERTIFICATE OF CORRECTION

PATENT NO.   : 6,414,716 B1  Page 1 of 1
DATED        : July 2, 2002
INVENTOR(S)  : Tomoaki Kawai It is certified that error appears in the above-identified patent and that said Letters Patent is hereby corrected as shown below:

<u>Title page,</u>
Insert:
-- [*] Notice: This patent issued on a continued prosecution application filed under 37 CFR 1.53(d) and is subject to the twenty year patent term provisions of 35 U.S.C. 154 (a)(2). --.

<u>Column 16,</u>
Line 22, "s aid" should read -- said --.

<u>Column 17,</u>
Line 52, "of" should be deleted, and "said A" should read -- a --.

Signed and Sealed this

Fourteenth Day of January, 2003

JAMES E. ROGAN
*Director of the United States Patent and Trademark Office*